United States Patent [19]

Handy

[11] Patent Number: 4,944,493
[45] Date of Patent: Jul. 31, 1990

[54] POST AND RAIL ASSEMBLY

[75] Inventor: Keith Handy, Blackburn, United Kingdom

[73] Assignee: Glasdon Group Limited, United Kingdom

[21] Appl. No.: 229,937

[22] Filed: Aug. 8, 1988

[30] Foreign Application Priority Data

Aug. 8, 1987 [GB] United Kingdom ............... 8718857

[51] Int. Cl.⁵ ............................................. E04H 17/00
[52] U.S. Cl. ........................................ 256/23; 256/65; 403/315
[58] Field of Search ..................... 256/23, 65, 64, 1; 403/252, 254, 315; 248/223.1, 222.4

[56] References Cited

U.S. PATENT DOCUMENTS

| 3,332,117 | 7/1967 | McCarthy | 403/315 |
| 3,643,923 | 2/1972 | Kirchhoff, Jr. | 256/65 X |
| 3,891,189 | 6/1975 | Russo | 256/1 |
| 4,787,602 | 11/1988 | Pidgeon | 256/23 |

FOREIGN PATENT DOCUMENTS

| 2052602 | 1/1981 | United Kingdom | 256/65 |
| 2147986 | 5/1985 | United Kingdom | 256/23 |

Primary Examiner—Peter M. Cuomo
Attorney, Agent, or Firm—Pravel, Gambrell Hewitt, Kimball & Krieger

[57] ABSTRACT

A post and rail assembly comprising a rail having one end of a flexible tether secured thereto, and a post provided with an aperture through which the flexible tether can be passed. The other end of the tether is provided with an enlarged head which in at least one orientation with respect to the aperture is incapable of passing therethrough. A locking element is releasably engageable with the post to restrict the aperture and prevent both passage of the enlarged head therethrough and removal of the end of the tether therefrom.

5 Claims, 2 Drawing Sheets

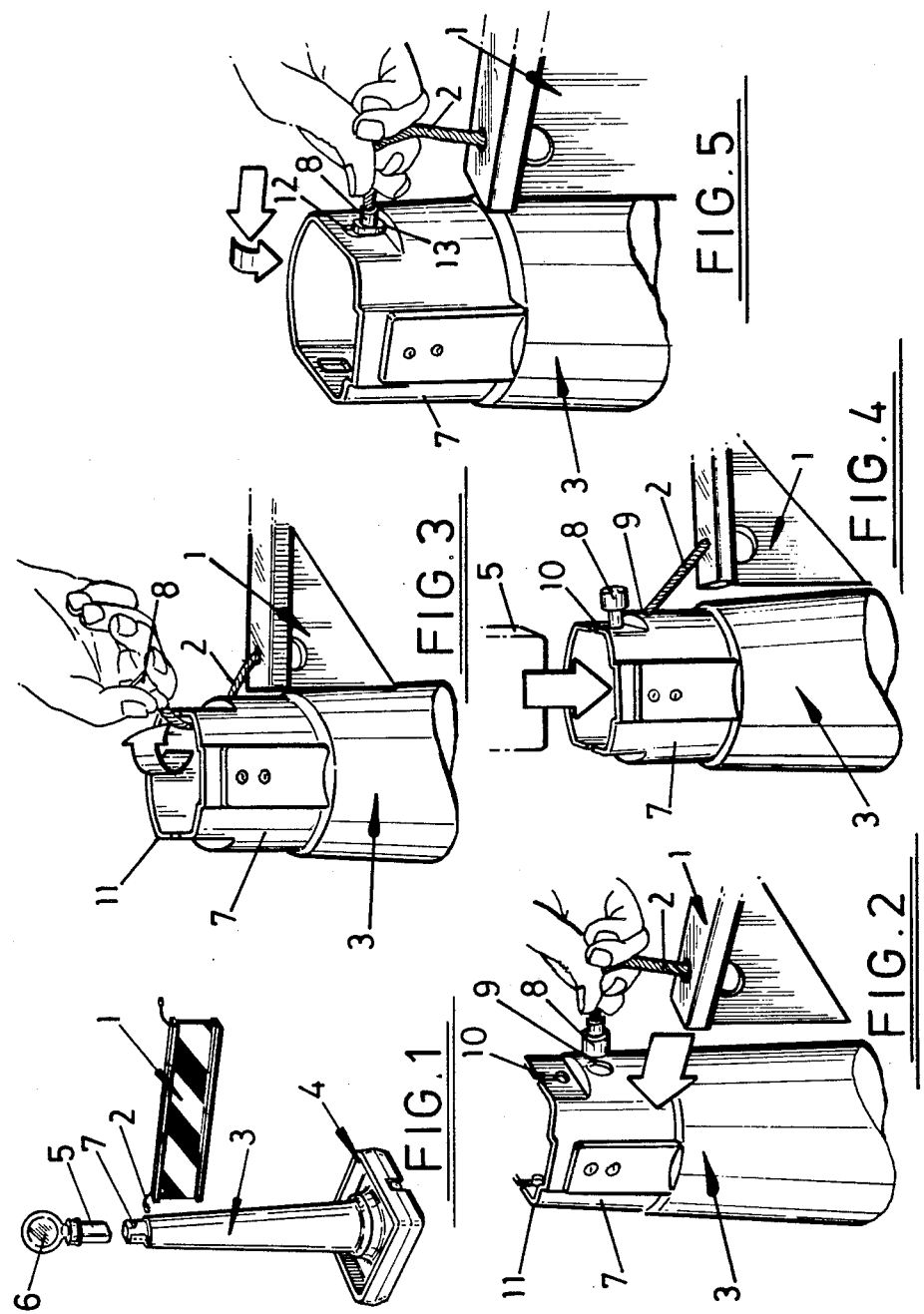

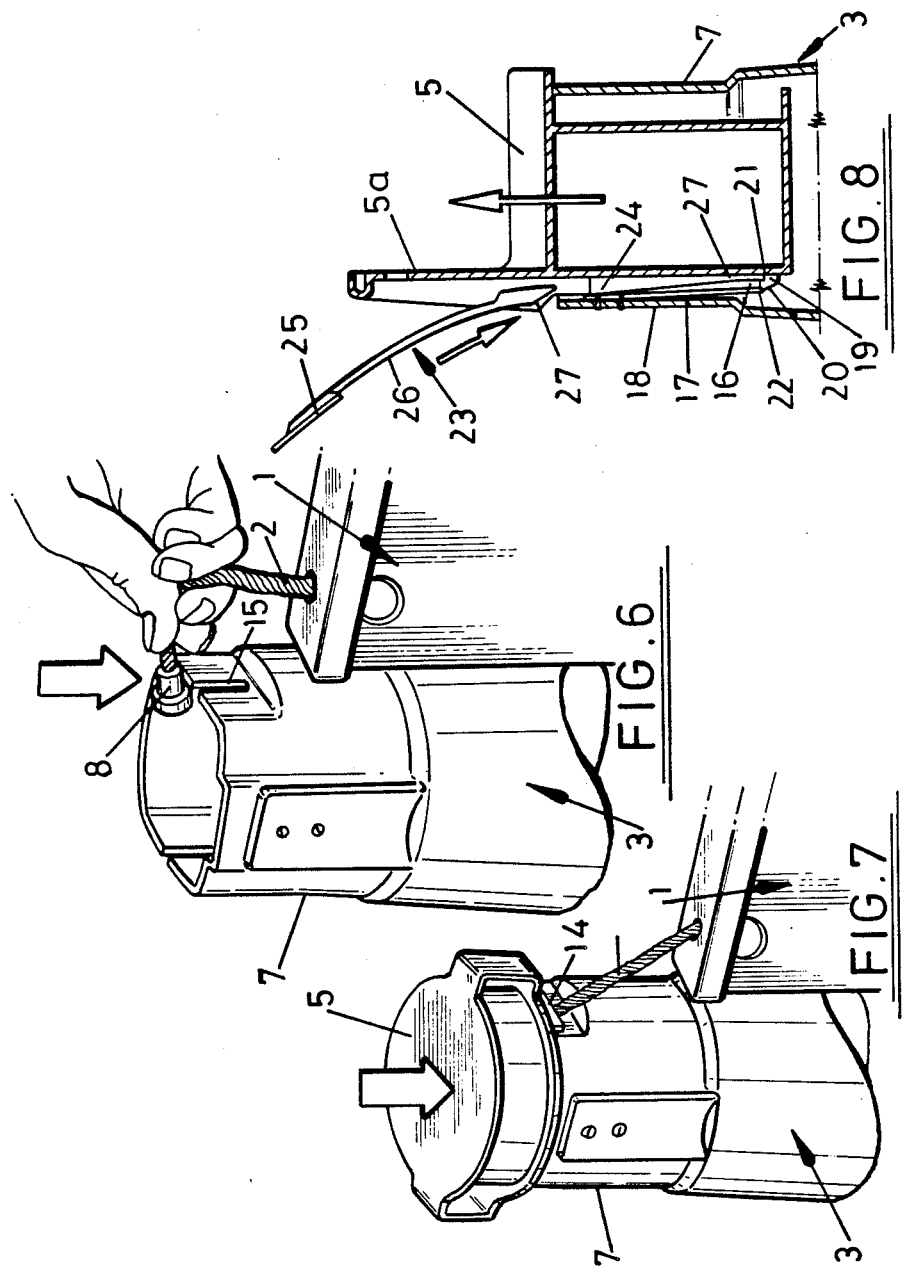

POST AND RAIL ASSEMBLY

The present invention relates to post and rail assemblies.

Road traffic and road works barriers are known in which horizontal rails are suspended by tethers at their ends between upright posts. British Patent Specification No. 1531724 describes one known arrangement in which rails are suspended on loops hooked onto upright posts, and British Patent Specification No. 1531725 describes a second known arrangement in which rails are suspended on ropes the ends of which support enlarged heads received in keyhole slots in upright posts. These known arrangements have proved successful as they provide a simple means for erecting a temporary barrier, a wide variety of barrier shapes can be constructed given that the relative positioning of the upright posts is not critical, and the effect of side winds on the barrier is reduced given that the rails can move to a limited extent relative to the upright posts.

Unfortunately although the known arrangements do enable a barrier to be erected very easily, they can also be dismantled very easily. This makes them particuarly vulnerable to unauthorised tampering.

British Patent Specification No. 2147986 describes a road traffic lamp unit supporting system comprising a lamp unit having an integral battery compartment which is inserted into a tubular upright support, and a simple locking mechanism which prevents removal of the lamp unit from the support unless an appropriate key is inserted into the support. The use of this arrangement has proved successful in limiting the frequency with which lamp units are removed by unauthorised persons.

It is an object of the present invention to provide a post and rail assembly in which a rail can be secured by a tether to a post in such a way as to discourage unauthorised tampering therewith to disconnect the rail from the post.

According to the present invention, there is provided a post and rail assembly comprising a rail having one end of a flexible tether secured thereto, a post provided with an aperture through which the flexible tether can be passed, the other end of the tether being provided with an enlarged head which in at least one orientation with respect to the aperture is incapable of passing therethrough, and a locking element releasably engagable with the post to restrict the aperture and prevent both passage of the enlarged head therethrough and removal of the end of the tether therefrom.

Preferably, the post is provided with a second aperture through which the enlarged head can be passed before the tether is passed through the first aforesaid aperture and the locking means is engaged with the post.

Preferably also, the first aperture comprises a slot which is open at one end to permit the tether to be passed therethrough but not the enlarged head.

Preferably, the locking element comprises an abutment means engageable with a second resiliently biased abutment means mounted on the post.

Preferably, the locking element can be disengaged from the post by means of a key.

The present invention will now be described by way of example with reference to the accompanying drawings, in which:

FIG. 1 is a perspective view of the components of a post and rail assembly;

FIG. 2 is an enlarged perspective view of part of a first embodiment of a post and a rail assembly at a first stage of the assembly procedure;

FIG. 3 is a view similar to FIG. 2 but from a different angle of the post and the rail at a second stage of the assembly procedure;

FIG. 4 is a view similar to FIG. 3 but at a third stage of the procedure;

FIG. 5 is a view similar to FIG. 2 but of a second embodiment of a post and rail assembly;

FIG. 6 is a view similar to FIG. 2 but of a third embodiment of a post and rail assembly; and FIG. 7 is a perspective view of the assemblies shown in FIGS. 5 and 6 when finally assembled;

FIG. 8 is a longitudinal sectional view of a post and a locking element forming part of an assembly according to the invention.

With reference to FIG. 1, an assembly suitable for use as a road traffic barrier comprises a rail 1 having one end of a flexible tether 2 secured thereto, a post 3 in the form of a cone with an enlarged base 4, and a locking element 5 for the tether 2 adapted to form part of a road hazard warning system such as a lamp 6 for mounting on top of the post 3. It is usual to mount warning systems such as lamps or reflectors on the top of the posts forming part of road traffic barriers. It is therefore envisaged that the locking element 5, which forms a part of the present invention, will be able to fulfil the dual function of locking the warning system 5 and of securing the tether to the post 3. It is not a requirement of the invention, however, that this be the case.

The post 3, as shown in FIG. 1, is preferably tubular and may, for example, be a tubular plastics upright, the base 4 of which may be a container closable by a removable plug or cover so that liquid ballast or particulate or friable solid ballast can be introduced therein. At its upper end, the post 3 has a substantially cylindrical portion 7 to which the rail 1 is attached by means of the tether 2, as will be described below, and which co-operates with the locking element 5.

Referring now to FIGS. 2 to 4 which show a first embodiment of post and rail assembly, the rail 1 has one end of a flexible tether 2, such as a rope, attached thereto and the free end of the tether 2 is provided with an enlarged head, in the form of a toggle 8. The upper cylindrical portion 7 of the post 3 is provided with a pair of apertures 9 and 10. The apertures 9 comprises a circular hole of dimensions sufficiently large to permit the passage of the toggle 8 therethrough. The aperture 10, however, is in the shape of an inverted keyhole and is open at the top to provide a slot in the rim 11 of the post 3. The toggle 8 cannot pass through the aperture 10 but the tether 2 being of reduced dimensions can be threaded into the aperture 10 downwardly from the rim 11 of the post 3.

In order to attach the rail 1 to the post 3, the toggle 8 is firstly passed through the aperture 9 into the interior of the post 3, as indicated in FIG. 2. The toggle 8 is then pulled out of the top of the post 3 and the attached tether 2 slotted into the aperture 10, the toggle 8 then abuts the rim 11 of the aperture 10 on the exterior of the post 3. The rail 1 is hence supported by the tether 2 which is attached to the post 3 and can be releasably locked thereto by the locking element 5. As shown in FIG. 4, the element 5 is designed to locate in the interior of the cylindrical portion 7 of the post. The actual locking mechanism employed to secure the element 5 to the post 3 is described below with reference to FIG. 8. However, it wil be appreciated that the element 5 forms a cap which closes the open end of the post 3 around the rim 11. It is, therefore, not possible to unfasten the tether 2 from the post 3 as the aperture 10 has been restricted by the element 5 closing the open end thereof and the toggle 8 is unable to pass through the aperture 10. The only way of disengaging the rail 1 from the post 3 when the locking element 5 is in position is to sever the tether 2. To discourage this, the tether 2 is preferably made from a tough plastics material.

FIG. 5 shows a second embodiment of the invention wherein the upper cylindrical portion 7 of the post 3 is provided with only a single aperture 12. As before, the flexible tether 2 is secured to the rail 1 and has a free end with an enlarged head in the form of a toggle 8. However, in this embodiment, the toggle 8 has a substantially rectangular end portion 13 and the aperture 12 is of a similar shape so that in one orientation, the toggle 8 can be passed through the aperture 12 into the interior of the post 3 but when then rotated through 90° cannot be withdrawn therefrom.

As in the first embodiment, once the rail 1 has been attached to the post 3, the locking element 5 same and thereby lock the toggle 8 in position by restricting the aperture 12. As shown in FIG. 7, in this embodiment the locking element 5 is preferably provided with a depending lug 14 which covers the upper portion of the aperture 12 and reduces its size such that the toggle 8 cannot then pass through in any orientation with respect to the aperture 12.

The third embodiment of post and rail assembly shown in FIG. 6 is similar to the second embodiment can be located in the open end of the post 3 to cap described above with reference to FIG. 5. However, in this embodiment the upper cylindrical portion 7 of the post 3 is provided with a slot 15 which is open at its upper end in the rim 11 of the post 3. The flexible tether 2 is attached to the rail 1, as before, but the toggle 8 does not have a special shape, as in the second embodiment described above, but is of a size which is incapable of passing through the slot 15.

In order to attach the rail 1 to the post 3, the tether 2 adjacent the toggle 8 is threaded into the slot 15 so that the toggle 8 holds the tether 2 by abutment against the edge of the slot 15 on the interior of the post 3. A locking element similar to as previously described with reference to FIG. 7 can then be located in the post 3 to lock the toggle 8 in position. A depending lug provided on the element covers the top portion of the slot 15 to prevent removal of the tether 2 therefrom.

Referring not to FIG. 8, one means of engaging the locking element 5 to the post 3 will now be described. The locking element 5 of FIG. 8 includes an upstanding portion 5a to which for example a lamp (not shown) may be secured. Engageable abutment means 16 are provided on the lower portion of the element 5 and on the interior of the post 3. Secured to the interior of a recess 17 formed in the interior wall surface of the post 3 is a metal strip 18. The strip 18 is bent and secured to the post 3 at one end only so that it forms a leaf spring depending downwardly into the post 3 and is resiliently biased towards the interior of the post 3. Engageable with the spring 18 is an abutment means in the form of a pair of outwardly projecting clips 19 located side by side on the lower edge of the element 5. The clips 19 are formed in the shape of an arrow head so that they each have a flat surface 20 extending outwardly from the element 5 at an acute angle which terminates with a second flat surface 21 projecting substantially normally from the adjacent surface of the element 5. As shown in FIG. 8, when the element 5 is pushed downwardly into the post 3, the surfaces 20 of the clips 19 bear against the spring 18 and displace it to allow location of the element 5 in the post 3. However, once the surfaces 20 are pushed past the lower edge 22 of the spring 18, the latter springs resiliently back to its former position. In this position, the lower edge 22 of the spring 18 is located above the surfaces 21 of the clips 19, which thereby prevent the element 5 from being withdrawn from the post 3.

Once the element 5 is located in position in the post 3, the recess 17 defines, with the adjacent surface of the element 5, a pocket at the base of which is located the abutment means 16. In order to disengage the element 5 from post 3 a key 23, as shown in FIG. 8, must be used. The pocket, therefore, protects the locking arrangement but allows access thereto for the key 23. Additionally, a channel 24 may be formed in the exterior surface of the element 5 adjacent the recess 17. The channel 24 runs between the clips 19 and is designed to assist in the correct location of the key 23 in the pocket.

The key 23 comprises a flexible plastics strip formed with the handle 25 at one end of a slender shank 26 and a wedge-shaped head 27 at the other end. The width of the head 27 is designed so that it can slide within the channel 24. However, the depth of the head 27 is designed to be greater than the combined depth of the surfaces 21 of the clips 19 and the depth of the channel 24.

To disengage the element 5 from the post 3, the head of the key 23 is inserted into the channel 24 and pushed downwardly into the pocket. The wedge-shaped head 27, being of greater dimensions than the chips 19, as described above, acts on the spring 18 so that the lower edge 22 of the spring 18 is biased away from the adapter 3 and eventually clear of the edge of the surfaces 21. When this occurs, the element 5 can then be lifted out of the post 3 along with the key 23.

In an alternative arrangement, the abutment means 16 could be arranged to be accessed by the key 23 through the hole or aperture formed in the cylindrical part 2 of the post 3.

Hence, it will be appreciated that the post and rail assembly of the present invention provides a means of creating, for example, a road traffic barrier which is easy to set up and substantially vandal proof. Additionally, the provision of a locking element disengageable from the post 3 by means of a key allows the assembly to be set up and taken down easily, when required. Although the examples described above have only related to the attachment of a single rail to a post, in practice, most posts would be provided with the means to support at least two rails so that a long barrier could be made up.

What is claimed is:

1. A post and rail assembly comprising:
   a rail;
   a first end of a flexible tether secured to said rail;
   a hollow upwardly open-ended post provided with a tether aperture through which said flexible tether may be passed;
   a second end of said tether having an enlarged head which in at least one orientation with respect to said aperture in said post is too large to pass therethrough;

and a locking element releasably engageable within said open end of said post to restrict said aperture and both prevent passage of said enlarged head therethrough and removal of said first end of said tether therefrom.

2. A post and rail assembly according to claim 1, wherein said post is provided with a further aperture which is larger than said enlarged head such that said enlarged head may be passed through said further aperture so that said tether may be passed through said tether aperture and said locking means may be engaged with said post.

3. A post and rail assembly according to claim 1, wherein:
said aperture comprises a slot which is open at one end and is wider than said tether but narrower than said enlarged head thereof.

4. A post and rail assembly according to claim 1, wherein:
said locking element comprises an abutment means engageable with a second resiliently biased abutment means mounted said post.

5. A post and rail assembly according to claim 1, wherein:
said locking element is disengageable from said post by means of a key.

* * * * *